United States Patent Office 3,401,122
Patented Sept. 10, 1968

3,401,122
PROCESS FOR PRODUCING DENSE PARTICLES OF OXIDES OF ACTINIDES USABLE AS FUELS FOR NUCLEAR REACTORS
Guido Cogliati, Ruggero De Leone, Enzo Mezi, Giancarlo Scibona, and Renato Lanz, Rome, Italy, assignors to Comitato Nazionale per l'Energia Nucleare, Rome, Italy
No Drawing. Filed June 15, 1965, Ser. No. 464,218
Claims priority, application Italy, June 24, 1964, 13,510
8 Claims. (Cl. 252—301.1)

ABSTRACT OF THE DISCLOSURE

Ceramic nuclear fuels are produced from a starting product consisting of a colloidal solution having a ratio nitrate to metals ranging from 0.5 to 1.8. The transformation of the colloidal solution into a gel is obtained by extracting the nitrates through anionic exchange with a liquid anionic exchanger contained in a water-immiscible solvent into which the colloidal solution is sprayed or dispersed which contains the actinides. The process is applicable both to thorium and to uranium and plutonium.

---

The object of this invention is, in general, the production of oxides of actinides and mixtures of oxides of actinides and particularly the production of dense particles of uranium dioxide, thorium and uranium oxide, uranium and plutonium oxide and thorium and plutonium oxide.

More specifically this invention relates to a process for producing dense particles of uranium dioxide and thorium oxide containing any percentage of uranium dioxide; which process comprises the following steps: preparing an acid-deficient solution of uranyl nitrate and/or thorium nitrate; catalytically reducing with hydrogen uranium (VI) to uranium (IV) and consequently forming a colloidal solution of uranium (IV); subdividing the colloidal solution to form particles of a desired shape and size, consolidating the particles of colloidal solution through withdrawing nitric acid; drying and calcining the consolidated particles.

It is known that the production of dense particles of fertile and/or fissile elements to be used both with cheap production methods of fuel elements, e.g. through vibration and to be used such as they are (or suitably covered with materials capable of preventing or reducing the release of the fission products) as fuel in a nuclear reactor, in which case they are sunk into a material with high thermal conductivity such as molten sodium, graphite or stainless steel, has been growing more and more important in the nuclear technologies during the last few years.

The methods sofar proposed for preparing such particles include thermal treatments at very high temperatures which reach in some cases the melting point of uranium dioxide and mechanical treatments of very low efficiency; the manufacturing cost of particles so produced is always very high.

The methods so far disclosed for producing dense particles of uranium dioxide and of thorium and uranium oxide in addition to being expensive are not suited for being employed in an automatized plant. However it is often convenient, in a process for regenerating irradiated fuel elements, not to reach the total decontamination of the active solution and therefore it is essential to operate a remotely controlled plant.

Furthermore, it should be kept in mind that the methods so far disclosed for preparing dense particles of uranium dioxide or of uranium and thorium oxide are suitable for yielding a ceramic product of which the characteristics such as the porosity, the specific surface, the density, etc. can be changed solely by acting during the calcination period of time and/or temperature. On the contrary the method of the present invention is suitable for yielding ceramic products of which the crystal size, the porosity and the specific surface are substantially different from one another; this being achieved by acting both on the conditions of the thermal treatment and on the conditions which govern the preparation of the colloidal solution.

It is therefore an object of the present invention to provide a simple and cheap method for preparing dense particles of uranium dioxide not requiring any thermal treatments at exceedingly high temperatures or complex mechanical processes or processes not suitable for giving quantity yields; said method being applicable to automatized plants.

It is another object of the present invention to provide a simple low cost method for producing dense particles of thorium oxide containing any percentage of uranium dioxide which method can be applied to an automatized plant.

It is a further object of the present invention to provide a method for preparing dense particles of uranium dioxide and thorium oxide containing any percentage of uranium dioxide, the properties of the final particles (e.g. the specific surface and the porosity) being closely controlled either by changing the conditions in which the colloidal solution is prepared or by means of final thermal treatments or both.

An additional object of the present invention is to provide a simple low cost method for preparing dense particles of uranium oxide containing plutonium oxide up to a concentration of 15 percent by weight which method is also adapted for being applied to an automatized plant.

The basic concept of the method herewith disclosed for obtaining the colloidal solution is the catalytic reduction with hydrogen of a concentrated and acid-deficient solution, of uranyl nitrate or of thorium nitrate plus uranyl nitrate.

Such acid deficient solutions of uranyl nitrate or thorium nitrate and uranyl nitrate show a concentration of uranium or thorium and uranium which ranges from 2 to 4 moles per liter and a ratio anion/metal which ranges from 0.5 to 1.8 and can be prepared through conventional methods such as e.g. through dissolving uranium trioxide in a solution of uranyl nitrate or through subtracting nitric acid from uranyl nitrate by means of an anion exchanging resin or by means of a liquid anion exchanger or through dialyzing a uranyl nitrate solution etc.

The catalytic reduction of uranyl nitrate acid-deficient solution, even if very concentrated, by means of pressurized hydrogen is not particularly difficult; this is achieved either through a discontinuous process in which an autoclave and a catalyzer are employed the latter consisting of pulverized alumina on which a metal of the platinum group has been deposited or through a continuous method in an autoclave containing pills or balls of aluminum oxide on which a metal of the platinum group has been deposited, said autoclave being fed with the uranyl nitrate acid-deficient solution together with a co-current pressurized hydrogen flow.

The reduction efficiency in any case is higher than 95 percent. The colloidal solutions obtained as above, are stable as far as the oxidizing action of the nitric acid is concerned and are very slowly oxidized by the atmospheric oxygen.

The colloidal solution is then dispersed (e.g. by spraying or suitably agitating) in an organic medium, not miscible with water, containing a suitable amount of liquid anion exchanger. The purpose of such anion exchanger is to subtract from the colloidal solution the residual amount of nitric acid and thereby to cause the gelling of the particles. The so obtained gel has a structure which is more or less orderly depending on the size of the particles which formed the colloidal solution and on the transverse links established.

This is the reason why crystals of remarkable size can be obtained even with calcination temperatures which are relatively low and why the gel grade and, as a consequence, the crystal size of the final product, can be controlled within certain limits.

This invention will be now illustrated by two examples.

EXAMPLE I

In 1 liter of a stoichiometrically neutral 2 M solution of uranyl nitrate 190 gr. of uranium trioxide are dissolved.

The solution so obtained is vaporized by boiling until a concentration of 3.2 moles of uranium per liter is obtained. The concentrated solution, to which pulverized alumina is added with 5 percent platinum for a total amount of 5 gr. of platinum, is introduced in an oscillating autoclave and therein reduced with hydrogen at the pressure of 30 kg./sq. cm. In one hour the reaction yield attains 99.1 percent. The colloidal solution is subsequently filtered to separate it from the catalyzer and is then dispersed in 20 liters of carbon tetrachloride suitably stirred by a blade agitator.

While stirring at a suitable rate, 1000 ml. of primene are added in 30 minutes. The stirring is then discontinued and the solid particles of uranium oxide are washed 3 times with 500 ml. of carbon tetrachloride and thereafter they are filtered. After filtering the particles are put in a furnace and therein dried for 6 hours at 80 deg. C. and finally calcined for 2 hours at 900 deg. C. in an atmosphere of hydrogen. The particles so obtained have an average diameter of 250 microns, a density (determined in carbon tetrachloride) equal to 96 percent of the theoretical density, an average crystal size of 5000 A. and a specific surface of 0.8 sq. m. per gr.

EXAMPLE II

To 10 liters of a 0.5 M thorium nitrate solution ammonium hydroxide is added until a complete precipitation of the thorium hydroxide is obtained. The precipitate is filtered and washed with warm water. The thorium hydroxide still wet is added at 80 deg. C. and while continuously agitating to 680 ml. of a 1 M uranyl nitrate solution. The adding of the thorium hydroxide is completed in about an 8 hour period and at the end a perfectly clear solution is obtained. This solution is fed with a co-current flow of hydrogen to a tubular autoclave in which the catalyzer is contained in the form of alumina pills which contain 1 percent by weight of finely divided platinum. The reduction is performed at a pressure of 40 kg./sq. cm. The autoclave capacity is 2 liters and the feeding rate of the solution is 2 liters per hour. At the column outlet the uranium (VI) has been transformed into uranium (IV) with a yield higher than 95 percent.

The thorium and uranium (IV) colloidal solution is sprayed in a cylindrical vessel containing a 5 percent by volume primene in carbon tetrachloride solution. The particles consolidation takes place during their fall to the bottom of the vessel. The particles are then filtered, washed with carbon tetrachloride, dried at 80 deg. C. for 5 hours and finally calcined at 1100 deg. C. in a hydrogen atmosphere. The resulting product comprises a solid solution of uranium dioxide in thorium oxide with a content of 15 percent by weight of uranium with a crystal size of about 800 A., a density equal to the 98 percent of the theoretical density and a specific surface of 40 sq. m. per gram.

What is claimed is:

1. A process for producing dense particles of uranium dioxide, which comprises the steps of forming a concentrated and acid-deficient solution of uranyl nitrate, of which solution the concentration ranges from 2 to 4 moles per liter of uranium and the ratio nitrates/uranium ranges from 0.5 to 1.8; catalytically reducing with hydrogen the uranyl nitrate solution and thereby obtaining a colloidal solution of uranium (IV); subdividing the colloidal solution into drops, dispersing the drops in a solvent not miscible with water containing an anion liquid exchanger, whereby the drops consolidate to a gel through subtraction of nitric acid; and drying and calcining the gel particles at temperatures higher thran 600 deg. C.; whereby the specific surface of the final particles is controlled by means of the temperature at which the colloidal solution is formed.

2. A process for producing dense particles of thorium oxide containing uranium dioxide, which comprises the steps of forming a concentrated and acid-deficient solution of thorium and uranyl nitrate, of which solution the concentration ranges from 2 to 4 moles per liter and the ratio nitrates/uranium+thorium ranges from 0.5 to 1.8, catalytically reducing with hydrogen the uranium (VI) present in said solution and obtaining a colloidal solution of thorium and uranium (IV); subdividing the colloidal solution into drops, dispersing the drops in a solvent not miscible with water containing an anion liquid exchanger, whereby the drops consolidate to a gel through nitric acid subtraction, and drying and calcining the gel particles at temperature higher than 600 deg. C.; whereby the average crystal size of the final particles is controlled by changing the temperature at which the colloidal solution is formed.

3. A process for producing dense particles of thorium and uranium oxide at a percentage of less than 15%, which comprises the steps of forming a colloidal solution of thorium and uranium (VI), wherein the concentration ranges from 2 to 4 moles per liter and the ratio nitrates/thorium-uranium ranges from 0.5 to 1.8, subdividing the colloidal solution into drops, dispersing the drops in a solvent not miscible with water containing an anion liquid exchanger, whereby the drops consolidate to a gel through subtraction of nitric acid; and drying and calcining the gel particles at temperatures above 600 deg. C. whereby the specific surface area of the final particles is controlled by the temperature at which the colloidal solution is formed.

4. A process for producing dense particles of uranium and plutonium dioxide at a percentage of plutonium dioxide less than 10%, comprising the steps of forming a solution of uranyl nitrate and plutonyl nitrate of which solution the concentration ranges from 2 to 4 moles per liter of uranium and plutonium and the ratio nitrates/uranium-plutonium ranges frame 0.5 to 1.8, catalytically reducing with hydrogen the uranyl and plutonium nitrate solution for obtaining a colloidal solution of uranium (IV) and plutonium (III); subdividing the colloidal solution into drops, dispersing the drops in a solvent not miscible with water containing an anion liquid exchanger and consolidating the colloidal solution drops to a gel through subtraction of nitric acid; and drying and calcining the gel particles at temperatures higher than 600 deg. C.; whereby the specific surface of the final particles is controlled by means of the temperature at which the colloidal solution is formed.

5. A process as per claim 1 in which the catalytic reduction is carried out continuously by passing the solution to be reduced together with a co-current flow of hydrogen under pressure through an autoclave containing alumina bodies on which an element has been deposited belonging to the group of platinum, palladium osmium, ruthenium and rhodium.

6. A process as per claim 5, in which the element deposited on alumina bodies is platinum.

7. A process in accordance with claim 1 in which the subdividing of the colloidal solution drops and the dispersion in the solvent are carried out by emulsifying said solution in said solvent through stirring.

8. A process in accordance with claim 1 in which the anion liquid exchanger contained in the solvent not miscible with water for subtracting the nitric acid is an aliphatic primary amine.

References Cited

UNITED STATES PATENTS

| 3,035,895 | 5/1962 | McCorkle et al. | 23—345 X |
| 3,262,760 | 7/1966 | Morse et al. | 23—355 |

FOREIGN PATENTS 904,679    8/1962    Great Britain.

CARL D. QUARFORTH, *Primary Examiner.*

R. L. GRUDZIECKI, *Assistant Examiner.*